(12) United States Patent
Uehara

(10) Patent No.: US 12,473,961 B2
(45) Date of Patent: Nov. 18, 2025

(54) DAMPER DEVICE AND METHOD OF ASSEMBLING SAME

(71) Applicant: EXEDY Corporation, Neyagawa (JP)

(72) Inventor: Hiroshi Uehara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 398 days.

(21) Appl. No.: 18/091,574

(22) Filed: Dec. 30, 2022

(65) Prior Publication Data

US 2023/0243400 A1 Aug. 3, 2023

(30) Foreign Application Priority Data

Feb. 1, 2022 (JP) .................................. 2022-014055

(51) Int. Cl.
*F16F 15/123* (2006.01)
*F16F 15/12* (2006.01)
(Continued)

(52) U.S. Cl.
CPC .... *F16F 15/12333* (2013.01); *F16F 15/1203* (2013.01); *F16F 15/13142* (2013.01); *F16F 15/13446* (2013.01); *Y10T 29/49895* (2015.01)

(58) Field of Classification Search
CPC ........... F16F 15/12326; F16F 15/12333; F16F 15/13438; F16F 15/13446; F16F 15/1203; F16F 15/13142; Y10T 29/49895
(Continued)

(56) References Cited

U.S. PATENT DOCUMENTS 6,645,079 B2 * 11/2003 Yoshimura ........ F16F 15/12333
464/68.92
8,021,234 B2 * 9/2011 Oono ................ F16F 15/12326
464/68.92
(Continued)

FOREIGN PATENT DOCUMENTS

DE          19751029 A1 *  5/1998  ........ F16F 15/13438
DE     102018215156 A1 *  3/2020  ............. F16F 1/127
(Continued)

OTHER PUBLICATIONS

Notice of Reasons for Refusal in corresponding Japanese Patent Application No. 2022014055, dated Oct. 7, 2025.

*Primary Examiner* — Josh Skroupa
(74) *Attorney, Agent, or Firm* — United IP Counselors, LLC

(57) ABSTRACT

In a method of assembling a damper device, a first support portion of a first rotor and a first accommodation portion of a second rotor are overlapped to eliminate an axial offset between them. A first elastic member is placed in the first support portion and the first accommodation portion. A second support portion of the first rotor and a second accommodation portion of the second rotor are overlapped to eliminate an axial offset between them by simultaneously compressing the first elastic member and rotating the second rotor relative to the first rotor to a first-side in a rotational direction. A second elastic member is placed in the second support portion and the second accommodation portion. Simultaneously, the second elastic member is compressed and the second rotor is rotated relative to the first rotor to a second-side in the rotational direction by angle corresponding to the offset between the first support portion and the first accommodation portion.

9 Claims, 11 Drawing Sheets

(51) Int. Cl.
*F16F 15/131* (2006.01)
*F16F 15/134* (2006.01)

(58) Field of Classification Search
USPC .......................................... 464/68.92; 29/464
See application file for complete search history.

(56) References Cited

U.S. PATENT DOCUMENTS

| | | | |
|---|---|---|---|
| 8,657,692 B2* | 2/2014 | Wahl ................ | F16F 15/12326 |
| | | | 464/68.92 |
| 9,970,487 B2* | 5/2018 | Fujii ................. | F16F 15/12326 |
| 11,236,800 B2* | 2/2022 | Aikawa ............. | F16F 15/12326 |
| 2012/0190462 A1 | 7/2012 | Wahl et al. | |
| 2017/0146071 A1 | 5/2017 | Adari | |

FOREIGN PATENT DOCUMENTS

| | | | | |
|---|---|---|---|---|
| EP | 0216476 A1 * | 4/1987 | ........ | F16F 15/12333 |
| JP | 2004116612 A | 4/2004 | | |
| JP | 2011-226572 A | 11/2011 | | |
| JP | 2017190844 A | 10/2017 | | |
| JP | 2019086009 A | 6/2019 | | |
| JP | 2019157965 A | 9/2019 | | |
| JP | 2020133748 A | 8/2020 | | |
| JP | 2022-030692 A | 2/2022 | | |

* cited by examiner

DAMPER DEVICE AND METHOD OF ASSEMBLING SAME

CROSS-REFERENCE TO RELATED APPLICATIONS

This application claims priority to Japanese Patent Application No. 2022-014055 filed Feb. 1, 2022. The entire contents of that application are incorporated by reference herein in their entirety.

TECHNICAL FIELD

The present invention relates to a damper device and a method of assembling the same.

BACKGROUND ART

A type of hybrid vehicle including an engine and an electric motor, for instance, uses such a damper device having a torque limiter function as described in Japan Laid-open Patent Application Publication No. 2011-226572 in order to prevent transmission of an excessive torque from an output side to an engine side in engine start and so forth.

The damper device described in Japan Laid-open Patent Application Publication No. 2011-226572 is provided with a damper part, including a pair of plates and a plurality of torsion springs, and a torque limiter disposed on an outer peripheral side of the damper part. The damper part and the torque limiter are coupled by rivets. Besides, a plate composing part of the torque limiter is fixed to a flywheel by bolts.

Here, a torque, transmitted between the damper part and the flywheel, is limited by the torque limiter, whereby transmission of an excessive torque is prevented therebetween.

The hybrid vehicle has chances of warming up the engine by driving the motor. In this case, the damper device, provided between the motor and the engine, is actuated over both positive-side and negative-side torsional actuation ranges by fluctuations in rotation of the engine. Accordingly, in the damper device, relative rotation between an input-side rotor and an output-side rotor alternately varies in direction. Hence, power is transmitted and received between members composing these rotors, and at this time, collision sound is supposed to be produced. Incidentally, when a gear train is provided for changing the speed of motor rotation, sound is produced in gear pairs composing the gear train due to a similar reason to the above.

In view of the above, the inventors of the present application have proposed a damper device that can inhibit sound from being produced when actuated over both positive-side and negative-side torsional actuation ranges. The inventors have already filed a patent application regarding the damper device (Japan Patent Application No. 2020-134863).

The damper device includes an elastic coupling part that elastically couples a first rotor and a second rotor in a rotational direction. The elastic coupling part includes a first elastic member and a second elastic member, each of which is preliminarily disposed in a compressed state in a neutral condition without torsion caused by relative rotation between the first rotor and the second rotor. In the neutral condition, torques act on respective members in opposite directions by the first and second elastic members; hence, noise can be inhibited from being produced in a predetermined torsional actuation range including the neutral condition.

In the damper device described above, the first and second elastic members are required to be assembled to the first and second rotors, while being compressed preliminarily; thus, elaboration is required in performing the assembling work.

It is an object of the present invention to enable the following in a damper device including a plurality of elastic members compressed preliminarily: assembling the elastic members with ease.

BRIEF SUMMARY (1) A method of assembling a damper device according to the present invention relates to a method of assembling a damper device including a first rotor, a second rotor, a first elastic member and a second elastic member. The first rotor includes a first support portion and a second support portion. The second rotor is rotatable relative to the first rotor and includes a first accommodation portion and a second accommodation portion. The first accommodation portion is provided to be offset from the first support portion to a first side in a rotational direction. The second accommodation portion is provided to be offset from the second support portion to a second side in the rotational direction. The first elastic member is disposed in a preliminarily compressed state in both the first support portion and the first accommodation portion. The second elastic member is disposed in a preliminarily compressed state in both the second support portion and the second accommodation portion.

Besides, the present method of assembling a damper device includes the following steps.

In a first step, the first support portion of the first rotor and the first accommodation portion of the second rotor are overlapped so as to eliminate the offset caused therebetween as seen in an axial direction.

In a second step, the first elastic member is disposed in both the first support portion and the first accommodation portion overlapped with each other.

In a third step, the second support portion of the first rotor and the second accommodation portion of the second rotor are overlapped so as to eliminate the offset caused therebetween as seen in the axial direction by simultaneously compressing the first elastic member and rotating the second rotor relative to the first rotor to the first side in the rotational direction.

In a fourth step, the second elastic member is disposed in both the second support portion and the second accommodation portion overlapped with each other.

In a fifth step, the second elastic member is compressed, and simultaneously, the second rotor is rotated relative to the first rotor to the second side in the rotational direction by an angle corresponding to the offset caused between the first support portion and the first accommodation portion.

(2) Preferably, in each of the steps, the first rotor is fixed to a first fixture in a non-rotatable manner.

(3) Preferably, the method further comprising a step of preparing a second fixture. The second fixture is rotatable about a rotational center of the second rotor. In the third step, the second fixture rotates the second rotor to the first side in the rotational direction. In the fifth step, by contrast, the second fixture rotates the second rotor to the second side in the rotational direction in the fifth step.

(4) Preferably, the first fixture includes a fixation portion, whereas the second fixture includes a pressing portion. The fixation portion makes non-rotatable one end surface of the first elastic member on the first side in the rotational direction. The pressing portion is capable of compressing the first elastic member in contact with the other end surface of the first elastic member on the second side in the rotational direction.

(5) Preferably, the damper device further includes a first seat member and a second seat member. The first seat member supports the one end surface of the first elastic member on the first side in the rotational direction. The second seat member supports the other end surface of the first elastic member on the second side in the rotational direction. In this case, the fixation portion of the first fixture is attachable to the first seat member in a detachable manner, while the pressing portion of the second fixture is attachable to the second seat member in a detachable manner. Besides, in the third and fifth steps, the fixation portion attached to the first seat member is caused to contact the one end surface of the first elastic member on the first side in the rotational direction so as to restrict movement of the one end surface of the first elastic member, whereas the pressing portion attached to the second seat member is caused to contact the other end surface of the first elastic member on the second side in the rotational direction so as to actuate the first elastic member.

(6) Preferably, a distance between the first and second seat members is equal in magnitude to a free length of the first elastic member.

(7) Preferably, the angle corresponding to the offset caused between the first support portion and the first accommodation portion is equal to an angle corresponding to the offset caused between the second support portion and the second accommodation portion.

(8) A damper device according to the present invention includes a first rotor, a second rotor, a first elastic member, a second elastic member, and a pair of seat members. The first rotor includes a first support portion and a second support portion. The second rotor is rotatable relative to the first rotor and includes a first accommodation portion and a second accommodation portion. The first accommodation portion is provided to be offset from the first support portion to a first side in a rotational direction. The second accommodation portion is provided to be offset from the second support portion to a second side in the rotational direction. The first elastic member is disposed in a preliminarily compressed state in both the first support portion and the first accommodation portion and elastically couples the first rotor and the second rotor in the rotational direction. The second elastic member is disposed in a preliminarily compressed state in both the second support portion and the second accommodation portion and elastically couples the first rotor and the second rotor in the rotational direction. The pair of seat members supports both end surfaces of the first elastic member. Each of the pair of seat members includes an assembling hole. The assembling holes of the pair of seat members enable a fixture for controlling actuation of the first elastic member to be attached thereto in a detachable manner when the first and second elastic members are assembled to the damper device.

Here, the fixture is attachable to the assembling holes provided in the pair of seat members. Besides, when the elastic members are assembled to the damper device, the first and second rotors can be rotated relative to each other with use of the fixture so as to eliminate the offset caused between each pair of the support portion and the accommodation portion. Therefore, in the damper device that the support portions and the accommodation portions are offset from each other, when the elastic members are assembled to the pairs of the support portion and the accommodation portion, the assembling work can be made easily.

(9) Preferably, the assembling holes of the pair of seat members are shaped to enable the fixture attached to the damper device to press the first elastic member in contact with both the end surfaces of the first elastic member.

Here, the first and second rotors can be rotated relative to each other through the first elastic member, while the fixture is in direct contact with the end surfaces of the first elastic member. In other words, a pressing force applied by the fixture does not act on the pair of seat members. Because of this, the pair of seat members is not required to be enhanced in strength.

Overall, according to the present invention described above, the following is enabled in a damper device including a plurality of elastic members compressed preliminarily: assembling the elastic members with ease.

DETAILED DESCRIPTION

[Entire Configuration]

Figure 1:
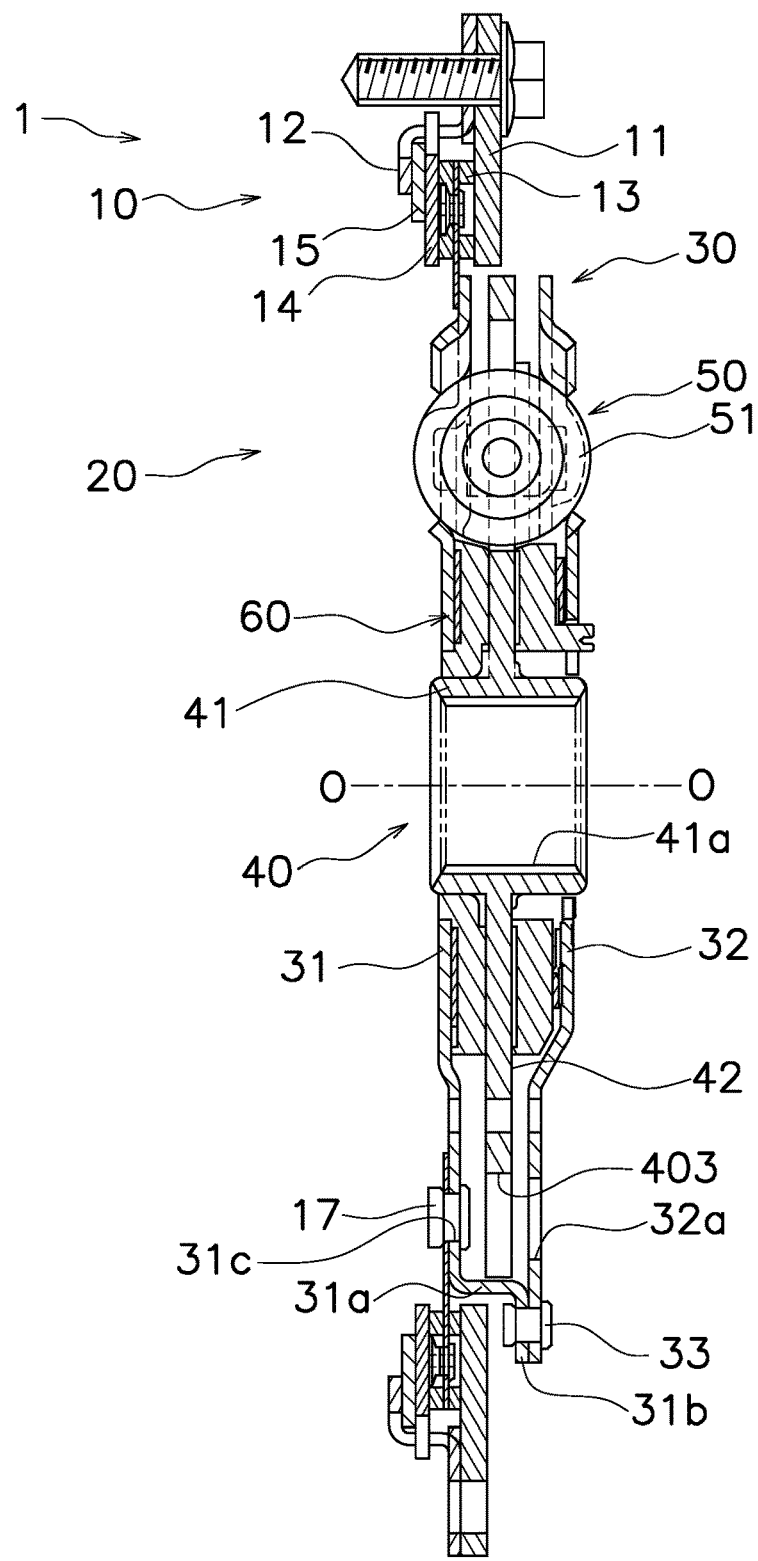
FIG. 1 is a cross-sectional view of a damper device according to a preferred embodiment of the present invention.
Figure 2:
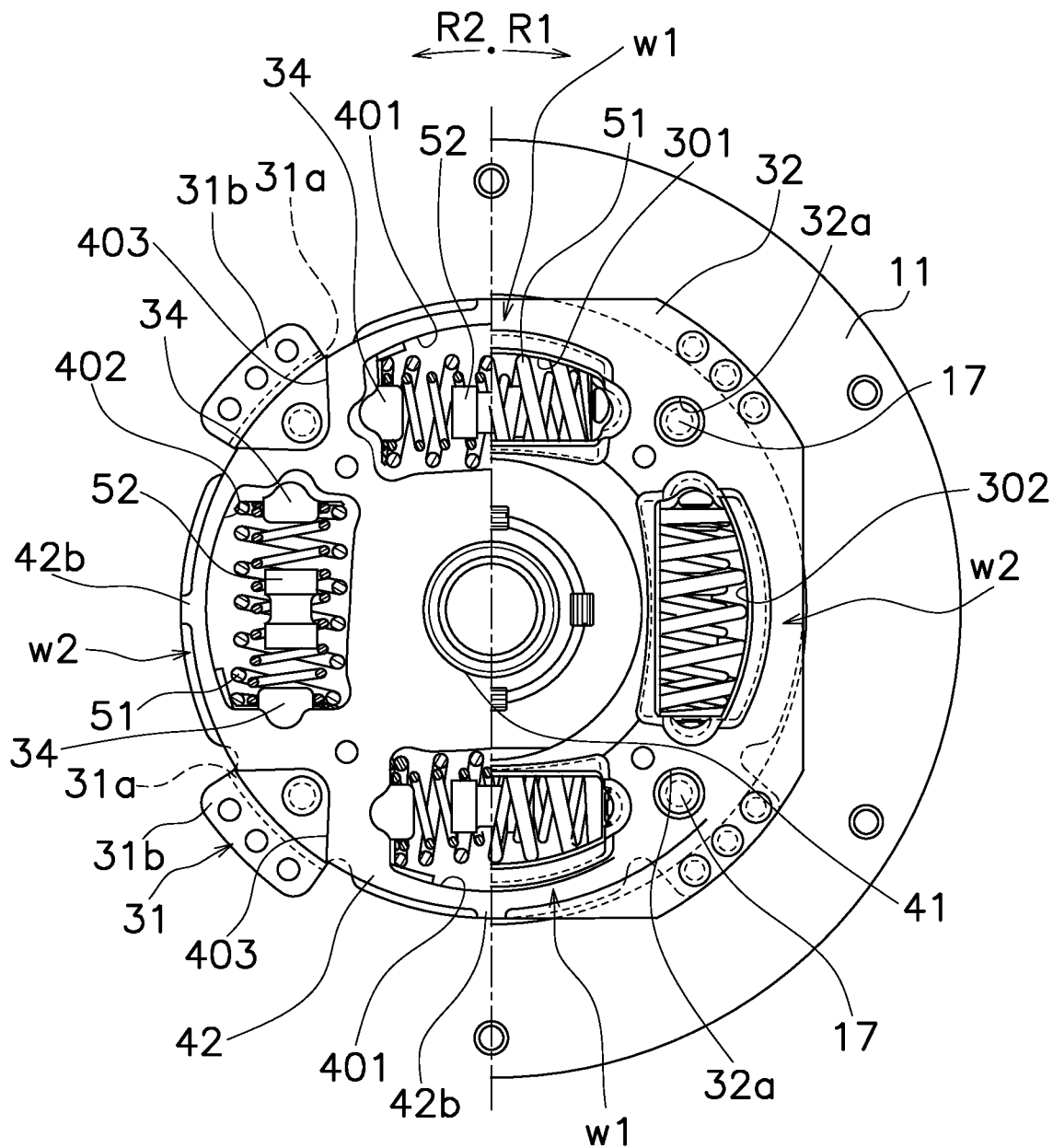
FIG. 2 is a front view of the damper device shown in FIG. 1.

FIG. 1 is a cross-sectional view of a torque limiter embedded damper device 1 (hereinafter simply referred to as "damper device 1") according to a preferred embodiment of the present invention. On the other hand, FIG. 2 is a front view of the damper device 1, from part of which some constituent members are detached. In FIG. 1, an engine (not shown in the drawing) is disposed on the left side of the damper device 1, whereas a drive unit (not shown in the drawing), including an electric motor, a transmission, and so forth, is disposed on the right side of the damper device 1.

It should be noted that in the following explanation, the term "axial direction" refers to an extending direction of a rotational axis O of the damper device 1. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with that of the imaginary circle about the rotational axis O. Likewise, the radial direction is not required to be perfectly matched with a diameter direction of the imaginary circle about the rotational axis O.

The damper device 1 is a device provided between a flywheel (not shown in the drawings) and an input shaft of the drive unit in order to limit a torque transmitted between the engine and the drive unit and attenuate rotational fluctuations. The damper device 1 includes a torque limiter unit 10 and a damper unit 20.

[Torque Limiter Unit 10]

The torque limiter unit 10 is disposed on the outer peripheral side of the damper unit 20. The torque limiter unit 10 limits the torque transmitted between the flywheel and the damper unit 20. The torque limiter unit 10 includes a cover plate 11, a support plate 12, a friction disc 13, a pressure plate 14, and a cone spring 15.

[Damper Unit 20]

The damper unit 20 includes an input-side plate 30 (exemplary first rotor), a hub flange 40 (exemplary second rotor), an elastic coupling part 50, and a hysteresis generating mechanism 60.

<Input-Side Plate 30>

The input-side plate 30 includes a first plate 31 and a second plate 32. The first and second plates 31 and 32, each of which is made in shape of a disc including a hole in the center part thereof, are disposed apart from each other at an interval in the axial direction. The first plate 31 includes four stopper portions 31*a* and four fixation portions 31*b* in the outer peripheral part thereof. Besides, each of the first and second plates 31 and 32 includes a pair of first support portions 301 and a pair of second support portions 302. The first and second support portions 301 and 302 provided in the first plate 31 are identical in position to those provided in the second plate 32. Besides, the first plate 31 is provided with holes 31*c* for rivets 17, whereas the second plate 32 is provided with assembling holes 32*a* in corresponding positions to the holes 31*c*. The friction disc 13 of the torque limiter unit 10 is fixed at the inner peripheral part thereof to the first plate 31 by the rivets 17 passing through the assembling holes 32*a*.

The stopper portions 31*a* are formed by bending the outer peripheral part of the first plate 31 toward the second plate 32 and extend in the axial direction. The fixation portions 31*b* are formed by bending the distal ends of the stopper portions 31*a* radially outward. The fixation portions 31*b* are fixed to the outer peripheral end of the second plate 32 by a plurality of rivets 33. Because of this, the first and second plates 31 and 32 are non-rotatable relative to each other and are axially immovable from each other.

Figure 3:
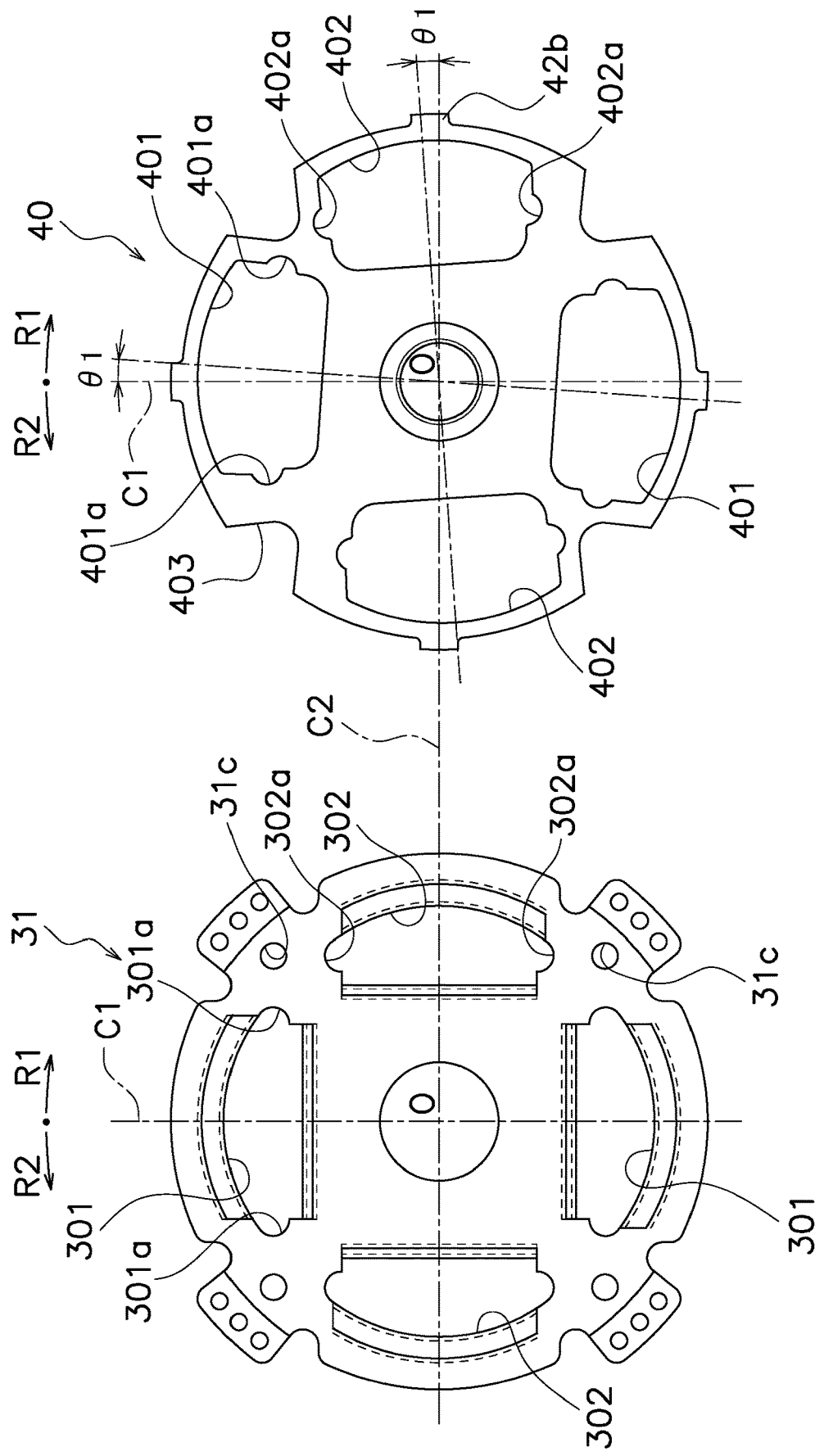
FIG. 3 is a diagram showing a positional relation between an input-side plate and a hub flange.

As shown in FIG. 2 and FIG. 3 including the first plate 31 extracted from FIG. 2, the first support portions 301, provided as a pair, are disposed in opposition to each other relative to the rotational axis O. On the other hand, the second support portions 302, provided as a pair, are disposed in opposition to each other relative to the rotational axis O, while being displaced from the first support portions 301 at angular intervals of 90°. The support portions 301 and 302 are identical in shape to each other; each includes a hole axially penetrating therethrough and an edge part formed by cutting and raising the inner and outer peripheral edges of the hole. Besides, recesses 301*a*, 302*a* are provided on both circumferential end surfaces of each support portion 301, 302 so as to be recessed therefrom circumferentially outward.

<Hub Flange 40>

As shown in FIGS. 1 and 2, the hub flange 40 includes a hub 41 and a flange 42. The hub flange 40 is rotatable relative to the input-side plate 30 in a predetermined angular range. The hub 41 has a tubular shape and is provided with a spline hole 41*a* in the center part thereof. Besides, the hub 41 penetrates both holes provided in the center parts of the first and second plates 31 and 32. The flange 42 has a disc shape and is shaped to extend radially outward from the outer peripheral surface of the hub 41. The flange 42 is disposed axially between the first and second plates 31 and 32.

The flange 42 includes four stopper protrusions 42*b*, a pair of first accommodation portions 401, a pair of second accommodation portions 402, and four cutouts 403.

The four stopper protrusions 42*b* are shaped to protrude radially outward from the outer peripheral surface of the flange 42. Each stopper protrusion 42*b* is provided in a position located radially outside the circumferential middle of each accommodation portion 401, 402. Now, when the input-side plate 30 and the hub flange 40 are rotated relative to each other, the stopper protrusions 42*b* contact the stopper portions 31*a* of the first plate 31; accordingly, relative rotation is prevented between the input-side plate 30 and the hub flange 40.

As shown in FIG. 2 and FIG. 3 including the hub flange 40 extracted from FIG. 2, the first accommodation portions 401, provided as a pair, are disposed in opposition to each other relative to the rotational axis O. On the other hand, the second accommodation portions 402, provided as a pair, are disposed in opposition to each other relative to the rotational axis O, while each is disposed circumferentially between the two first accommodation portions 401. The accommodation portions 401 and 402 are identical in shape to each other; each is an approximately rectangular hole that the outer peripheral part thereof is made in shape of a circular arc. Besides, recesses 401*a*, 402*a* are provided on both circumferential end surfaces of each accommodation portion 401, 402 so as to be recessed therefrom circumferentially outward.

Each of the four cutouts 403 is provided circumferentially between adjacent two accommodation portions 401 and 402 and is recessed radially inward from the outer peripheral surface of the flange 42 at a predetermined depth. The cutouts 403 are provided in corresponding positions to the rivets 17 by which the first plate 31 and the friction disc 13 of the torque limiter unit 10 are coupled to each other. Therefore, the torque limiter unit 10 and the damper unit 20, assembled in different steps, can be fixed to each other by the rivets 17 with use of the assembling holes 32*a* of the second plate 32 and the cutouts 403 of the flange 42.

<Layout of Support Portions and Accommodation Portions>

FIG. 3 shows a positional relation of the hub flange 40 with respect to the input-side plate 30 (herein the first plate 31) in the neutral condition. In FIG. 3, straight line C1 is an imaginary line that passes through the rotational axis O and the centers of the pair of first support portions 301. On the other hand, straight line C2 is an imaginary line that passes through the rotational axis O and the centers of the pair of second support portions 302. In an assembled condition, the input-side plate 30 and the hub flange 40 are assembled to overlap with each other, while the positional relation shown in FIG. 3 is maintained. The term "neutral condition" herein refers to a condition that an angle of relative rotation between the input-side plate 30 and the hub flange 40 is 0° (i.e., a condition made at a torsion angle of 0° without torsion therebetween).

The pair of first accommodation portions 401 is disposed in corresponding positions to the pair of first support portions 301. On the other hand, the pair of second accommodation portions 402 is disposed in corresponding positions to the pair of second support portions 302. In more detail, the pair of first accommodation portions 401 is disposed to overlap in part with the pair of first support portions 301 and be offset (or displaced) from the pair of first support portions 301 to a first side in a rotational direction (hereinafter simply referred to as "R1 side") by an angle θ1 as seen in the axial direction. In other words, the pair of first accommodation portions 401 is disposed to be offset to the R1 side by the angle θ1 from the straight line C1. On the other hand, the pair of second accommodation portions 402 is disposed to overlap in part with the pair of second support portions 302 and be offset from the pair of second support portions 302 to a second side in the rotational direction (hereinafter simply referred to as "R2 side") by the angle θ1 as seen in the axial direction. In other words, the pair of second accommodation portions 402 is disposed to be offset to the R2 side by the angle θ1 from the straight line C2.

<Spring Seats 34>

Spring seats 34, provided as a pair, are attached to each axially opposed pair of first support portions 301 and each first accommodation portion 401 (hereinafter collectively referred to as "first window portion w1" on an as-needed basis), while in opposition to each other; likewise, spring seats 34, provided as a pair, are attached to each axially opposed pair of second support portions 302 and each second accommodation portion 402 (hereinafter collectively referred to as "second window portion w2" on an as-needed basis), while in opposition to each other.

Figure 4:
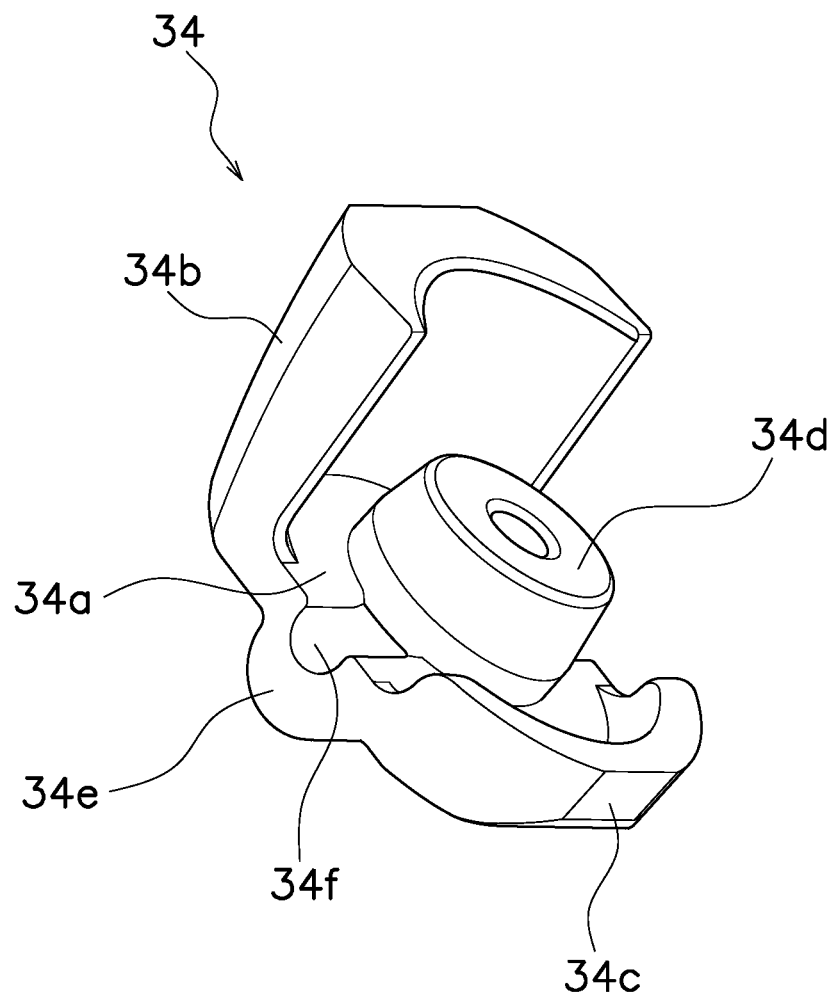
FIG. 4 is an external perspective view of a spring seat.

As shown in FIG. 4, each spring seat 34 includes a support surface 34a having a disc shape, an outer peripheral-side support portion 34b, an inner peripheral-side support portion 34c, a protruding portion 34d, and a pin inserted portion 34e. The outer peripheral-side support portion 34b is shaped to extend from the radially outer end of the support surface 34a in the circumferential direction and is made in shape of a circular arc bulging radially outward. The inner peripheral-side support portion 34c is shaped to extend from the radially inner end of the support surface 34a in the circumferential direction and is made in shape of a circular arc bulging radially inward. The protruding portion 34d has a cylindrical shape and is shaped to protrude from a middle part of the support surface 34a in the circumferential direction. The pin inserted portion 34e is shaped to extend in the axial direction, while bulging from the support surface 34a to the opposite side of the protruding portion 34d. The pin inserted portion 34e is provided with a penetrating groove 34f extending in the axial direction. The penetrating groove 34f has an approximately semicircular cross section and is opened in the protruding direction of the protruding portion 34d.

In each spring seat 34, one of coil springs 51 (to be described) contacts at one end surface thereof with the support surface 34a. The coil spring 51 is supported by the outer peripheral-side portion 34b from the radially outer side, while being supported by the inner peripheral-side support portion 34c from the radially inner side. The protruding portion 34d enters the interior of the coil spring 51. One of pins of a fixture (to be described) is inserted into the penetrating groove 34f of the pin inserted portion 34e in assemblage of the coil spring 51. Besides, the pin inserted into the penetrating groove 34f is enabled to directly press the end surface of the coil spring 51.

A condition that the spring seats 34 are disposed in each window portion w1, w2 will be herein assumed. Under the condition, when the entirety of each axially opposed pair of first support portions 301 of the first-side plate 30 and the entirety of each first accommodation portion 401 of the hub flange 40 overlap with each other as seen in the axial direction (i.e., when an offset angle is "0"), the distance between the support surfaces 34a of the spring seats 34 opposed to each other is set to be L. Likewise, when the entirety of each axially opposed pair of second support portions 302 and the entirety of each second accommodation portion 402 overlap with each other as seen in the axial direction, the distance between the support surfaces 34a of the spring seats 34 opposed to each other is set to be L.

<Elastic Coupling Part 50>

The elastic coupling part 50 includes four coil springs 51 (exemplary first and second elastic members) and four resin members 52. Each coil spring 51 is composed of an outer spring and an inner spring. The four coil springs 51 are accommodated in the accommodation portions 401 and 402 of the flange 42, respectively, while being supported in both radial and axial directions by the support portions 301 and 302 of the input-side plate 30, respectively. The coil springs 51 are actuated in parallel.

Incidentally, the four coil springs 51 are equal in free length (Sf). The free length Sf of each coil spring 51 is equal in magnitude to the distance L between the support surfaces 34a of the opposed spring seats 34 attached to each window portion w1, w2 in the condition that the offset angle is "0".

<Accommodation States of Coil Springs 51>

Now, a state of each coil spring 51 accommodated in each window portion w1, w2 in the neutral condition will be hereinafter explained in detail.

As described above, in the neutral condition, the pair of first accommodation portions 401 is offset from the axially opposed pairs of first support portions 301 to the R1 side by the angle θ1. On the other hand, the pair of second accommodation portions 402 is offset from the axially opposed pairs of second support portions 302 to the R2 side by the angle θ1. Besides, each coil spring 51 is attached in a compressed state to an opening (axially penetrating hole) formed by axial overlap between each axially opposed pair of support portions 301, 302 and each corresponding accommodation portion 401, 402.

[Assembling Method]

A method of assembling the damper unit 20 of the damper device 1 described above will be explained with drawings of FIGS. 5A to 5D and thereafter. FIGS. 5A to 5D schematically show the hub flange 40, the spring seats 34, and the coil springs 51. It should be noted that in the following explanation, assemblage of respective members composing the hysteresis generating mechanism 60 will be omitted.

<Preparation of Fixtures>

Figure 6:
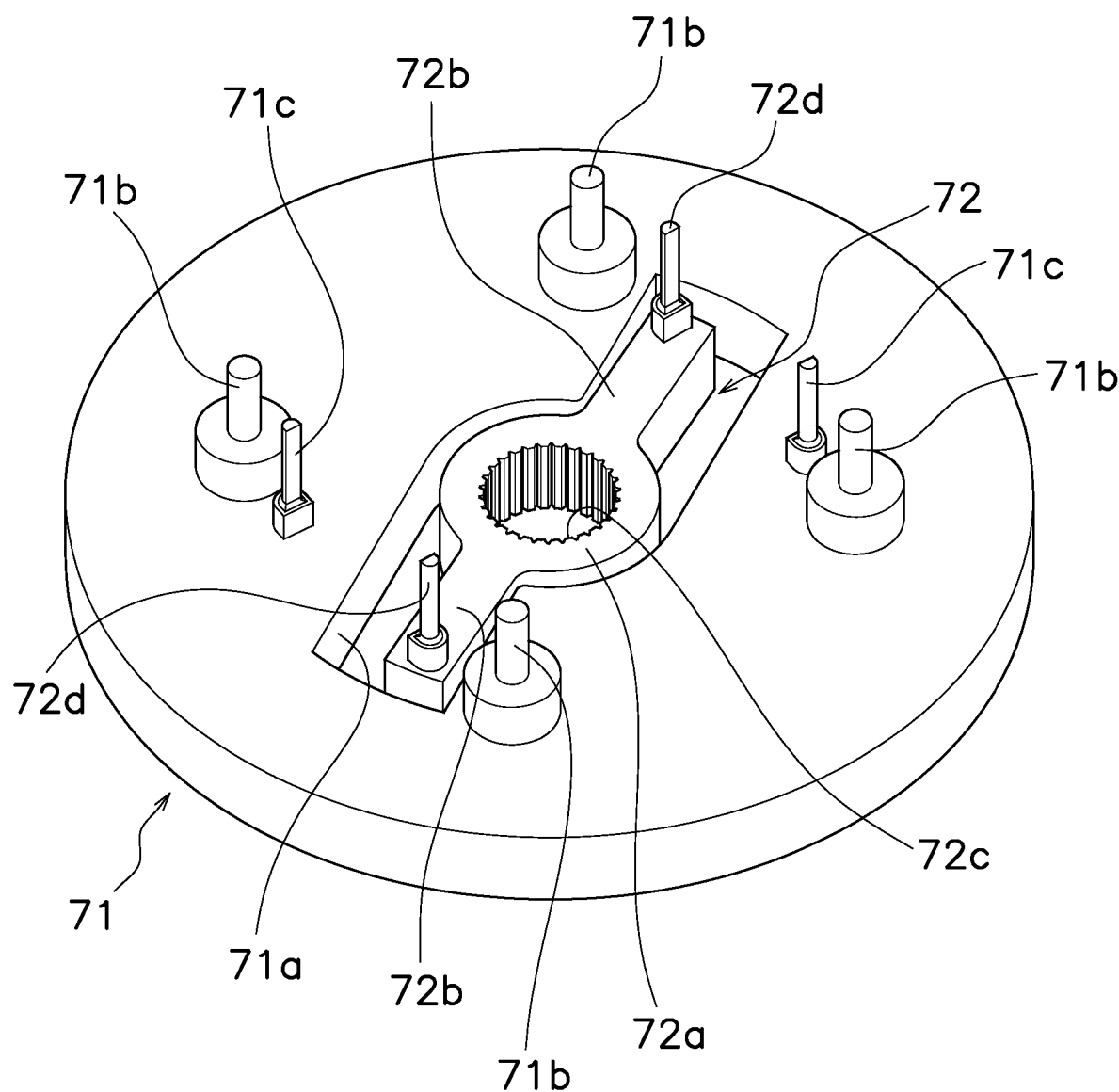
FIG. 6 is an external perspective view of fixtures.

First, a first fixture 71 and a second fixture 72 are prepared as shown in FIG. 6. The first fixture 71 has a disc shape and includes an opening 71a in the middle part thereof. The opening 71a is composed of a circular hole provided in the center part thereof and a pair of elongated holes extending radially outward from the circular hole in opposite directions. The elongated holes, provided as a pair, are disposed to be offset in the circumferential direction.

Besides, the first fixture 71 includes four fixation pins 71b and two movement restricting pins 71c. The fixation pins 71b and the movement restricting pins 71c are shaped to protrude upward from the surface of the first fixture 71. The fixation pins 71b are insertable into the rivet holes 31c of the first plate 31, respectively. On the other hand, the movement restricting pins 71c are insertable into the penetrating grooves 34f provided in two of the spring seats 34, respectively.

The second fixture 72 is disposed inside the opening 71a of the first fixture 71 and includes a disc portion 72a and a pair of arm portions 72b. The disc portion 72a has a disc shape and is provided with a spline hole 72c in the center part thereof so as to rotate the second fixture 72. The pair of arm portions 72b extends radially outward from the outer peripheral part of the disc portion 72a in opposite directions. Besides, the pair of arm portions 72b is provided with a pair of pressing pins 72d protruding upward from the radially outer ends thereof.

The first fixture 71, configured as described above, is fixed onto a table (not shown in the drawings). The table is herein provided with a rotatable spline shaft (not shown in the drawings). Next, the second fixture 72 is inserted into the opening 71a of the first fixture 71; then, the spline shaft is inserted into the spline hole 72c. With this structure, in conjunction with rotation of the spline shaft, the second fixture 72 is made rotatable inside the opening 71a of the first fixture 71 by a predetermined angle.

<Setting of First Plate 31>

Figure 7:
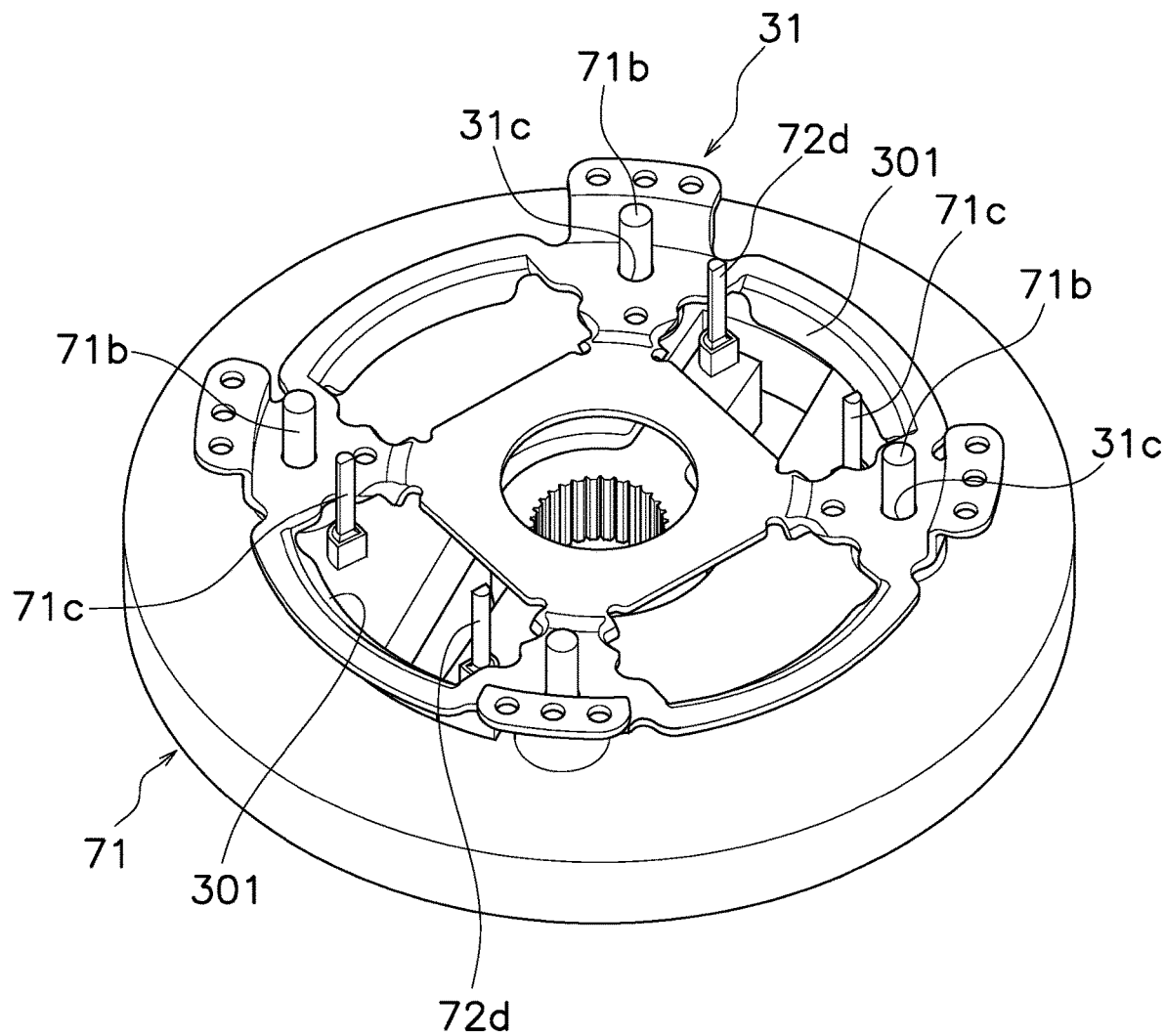
FIG. 7 is an external perspective view at a point of time in the course of assemblage.

As shown in FIG. 7, the first plate 31 is set to the first fixture 71. Specifically, the fixation pins 71b of the first fixture 71 are inserted into the rivet holes 31c of the first plate 31, respectively, whereby the first plate 31 is fixed to the first fixture 71 in a non-rotatable manner. It should be noted that in this condition, each movement restricting pin 71c of the first fixture 71 and each pressing pin 72d of the second fixture 72 are both disposed inside each first support portion 301. Thereafter, assemblage of a first bushing (not illustrated in FIG. 7) is made.

<Setting of Hub Flange 40>

Figure 5A:
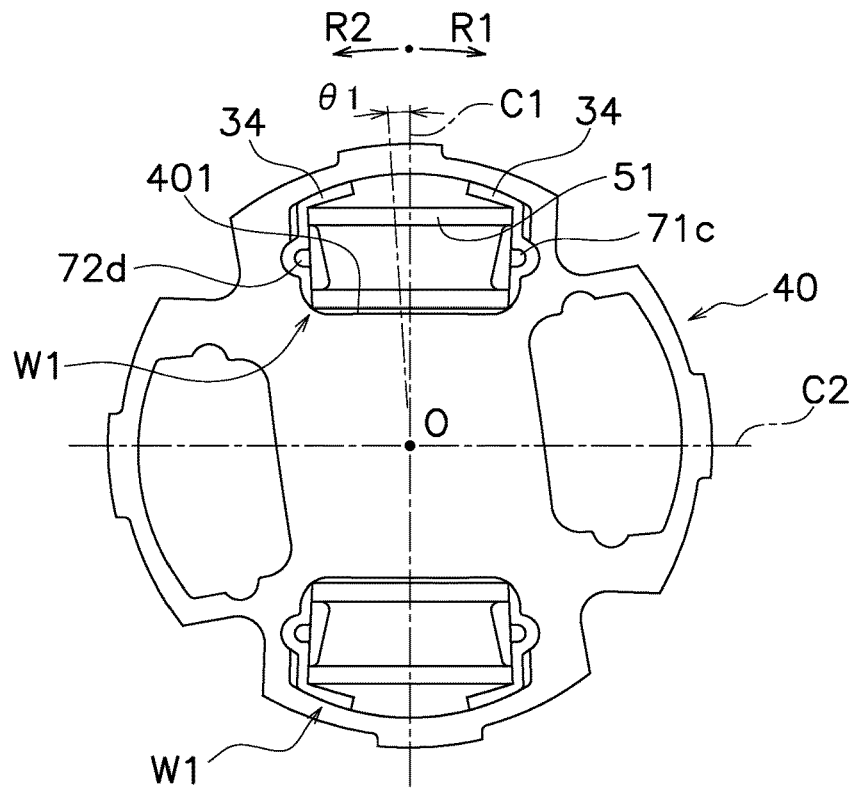
FIG. 5A is a schematic diagram for explaining an assembling method.
Figure 8:
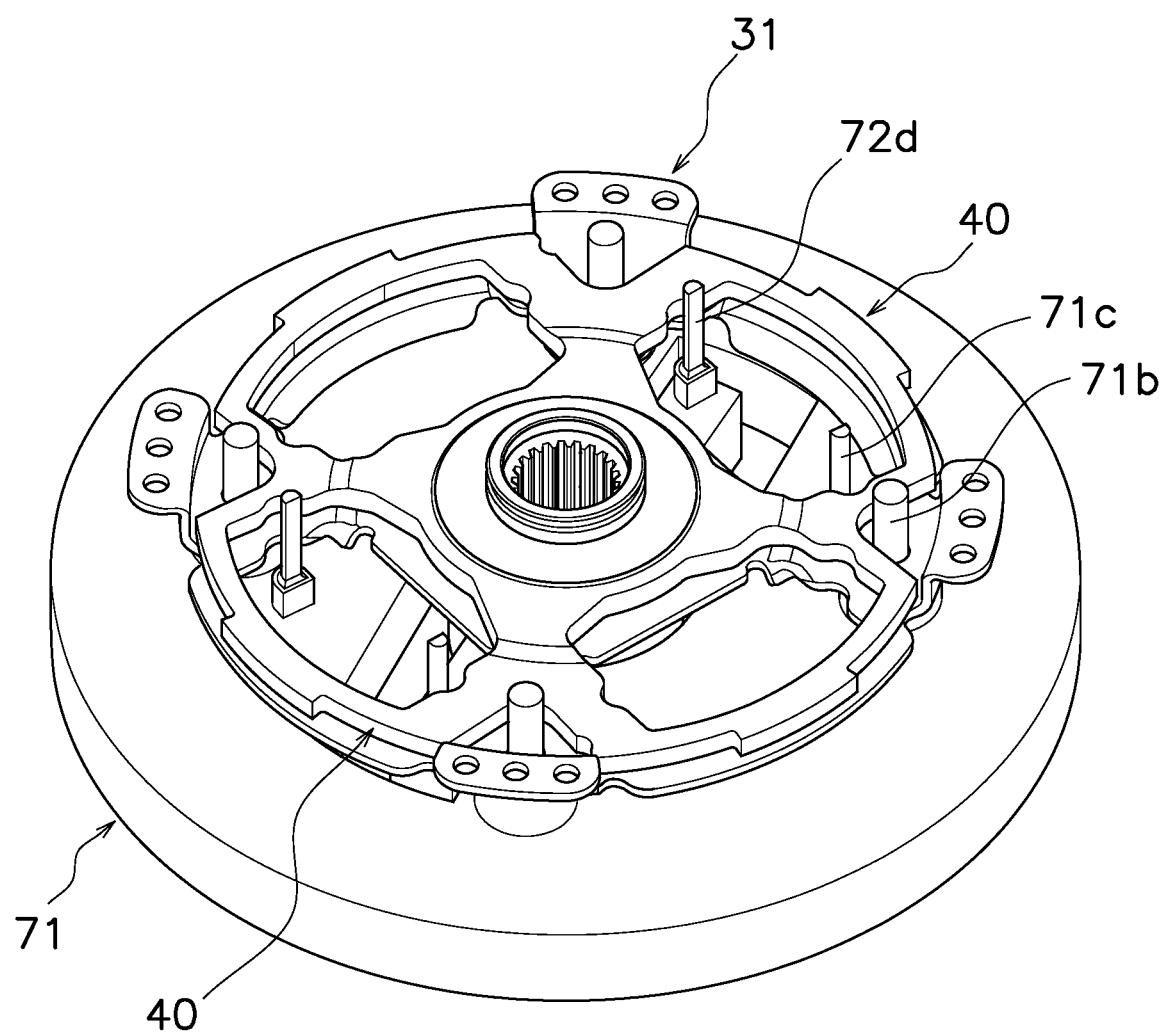
FIG. 8 is an external perspective view at another point of time in the course of assemblage.

As shown in FIGS. 5A and 8, setting of the hub flange 40 is made. Specifically, setting of the hub flange 40 is made such that the entirety of each first support portion 301 of the first plate 31 and the entirety of each first accommodation portion 401 of the hub flange 40 overlap with each other as seen in the axial direction. In other words, setting of the hub flange 40 is made by rotating the hub flange 40 to the R2 side by the angle θ1 from the position thereof in the neutral condition such that the offset angle becomes "0".

<Setting of Spring Seats 34 and Setting of Coil Springs 51 in First Window Portions w1>

Figure 9:
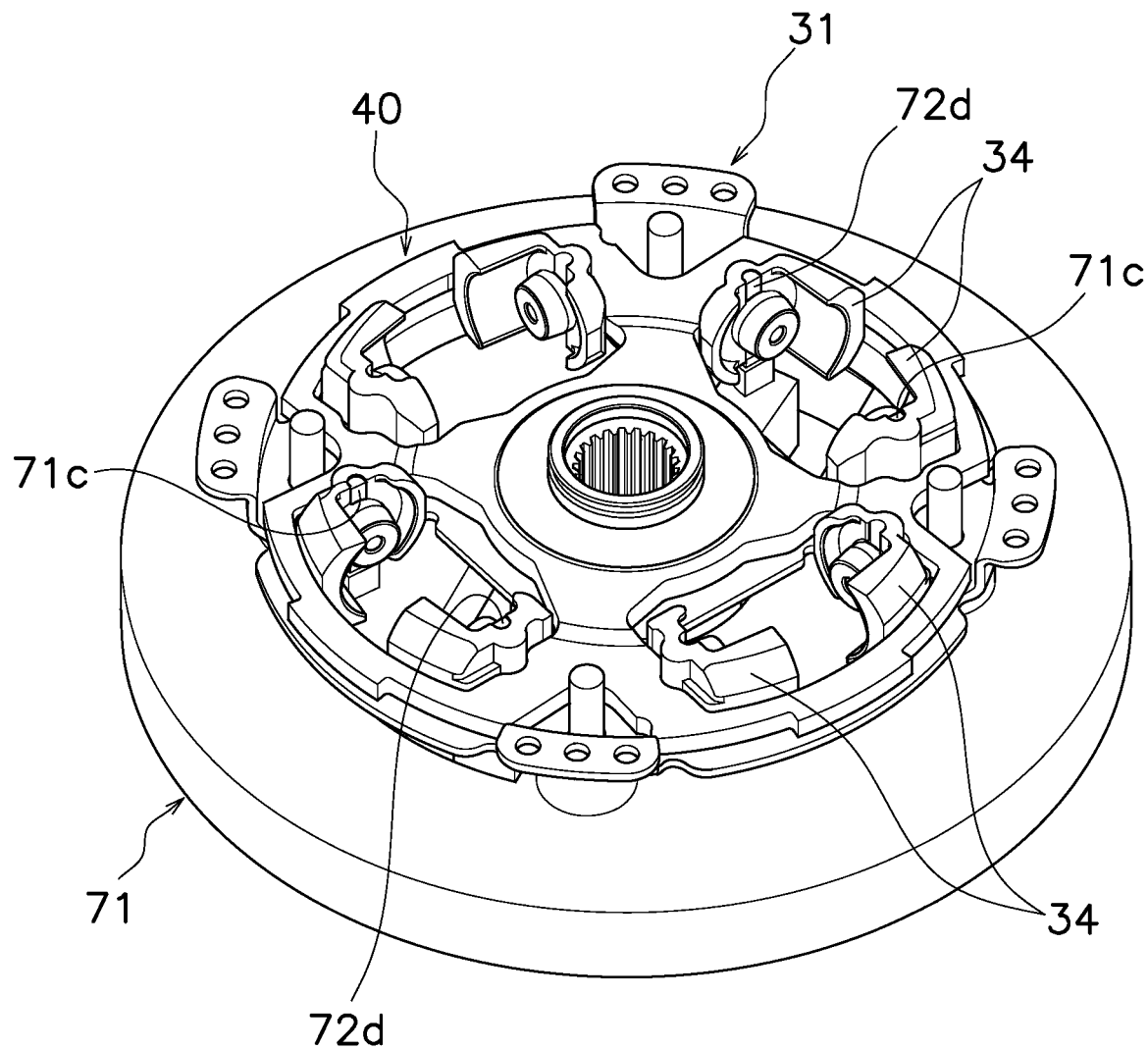
FIG. 9 is an external perspective view at yet another point of time in the course of assemblage.

As shown in FIGS. 5A and 9, the spring seats 34 are set in the first window portions w1 and the second window portions w2. At this time, setting of the spring seats 34 is made in each first window portion w1 such that the movement restricting pin 71c penetrates the penetrating groove 34f in the R1-side spring seat 34 (exemplary first seat member), while the pressing pin 72d penetrates the penetrating groove 34f in the R2-side spring seat 34 (exemplary second seat member). Therefore, in each first window portion w1, the R1-side spring seat 34 is restricted from rotating; however, the R2-side spring seat 34 is rotatable together with the second fixture 72.

In this condition, the coil spring 51 and the resin member 52 are set to each first window portion w1. Now, as shown in FIG. 5A, the entirety of each first support portion 301 and the entirety of each first accommodation portion 401 in each first window portion w1 overlap with each other as seen in the axial direction; besides, the distance L between the support surfaces 34a of the spring seats 34 opposed to each other is equal in magnitude to the free length Sf of the coil spring 51. Therefore, the coil spring 51 can be easily assembled to each first window portion w1 without being compressed.

<Setting of Coil Springs 51 to Second Window Portions w2>

Figure 5B:
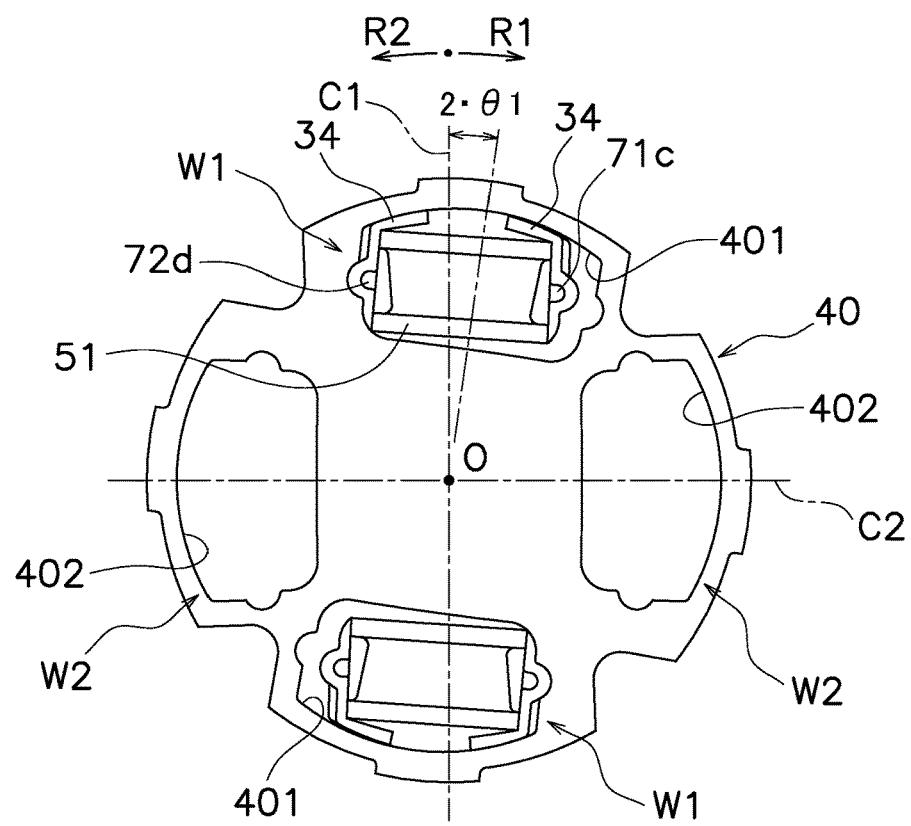
FIG. 5B is a schematic diagram for explaining the assembling method.

Next, as shown in FIG. 5B, the second fixture 72 is rotated to the R1 side by an angle 2·θ1. In other words, the hub flange 40 is rotated to the R1 side, while compression of the coil spring 51 in each first window portion w1 is made by directly pressing one end surface of the coil spring 51 with the pressing pin 72d of the second fixture 72. Accordingly, in each second window portion w2, the entirety of the second support portion 302 and the entirety of the second accommodation portion 402 overlap with each other as seen in the axial direction.

Figure 5C:
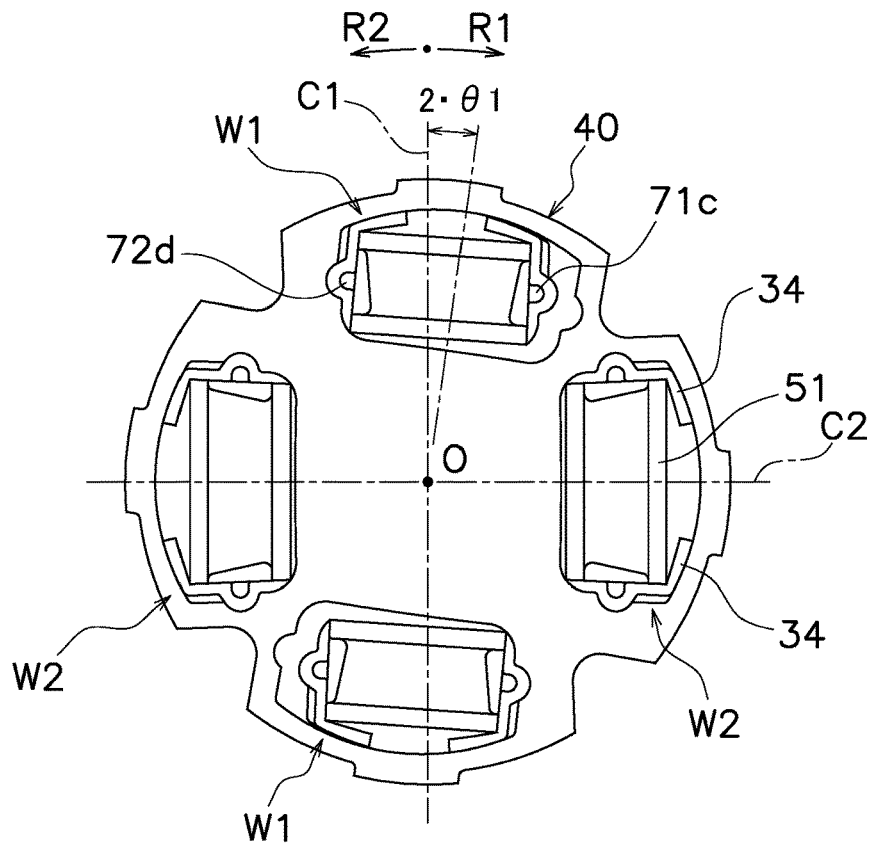
FIG. 5C is a schematic diagram for explaining the assembling method.

In this condition, as shown in FIG. 5C, the spring seats 34, the coil spring 51, and the resin member 52 are set to each second window portion w2. As described above, the distance L between the support surfaces 34a of the spring seats 34 opposed to each other is herein equal in magnitude to the free length Sf of the coil spring 51; hence, in a similar manner to the above, the coil spring 51 can be easily assembled to each second window portion w2 without being compressed.

<Setting to Neutral Condition>

Figure 5D:
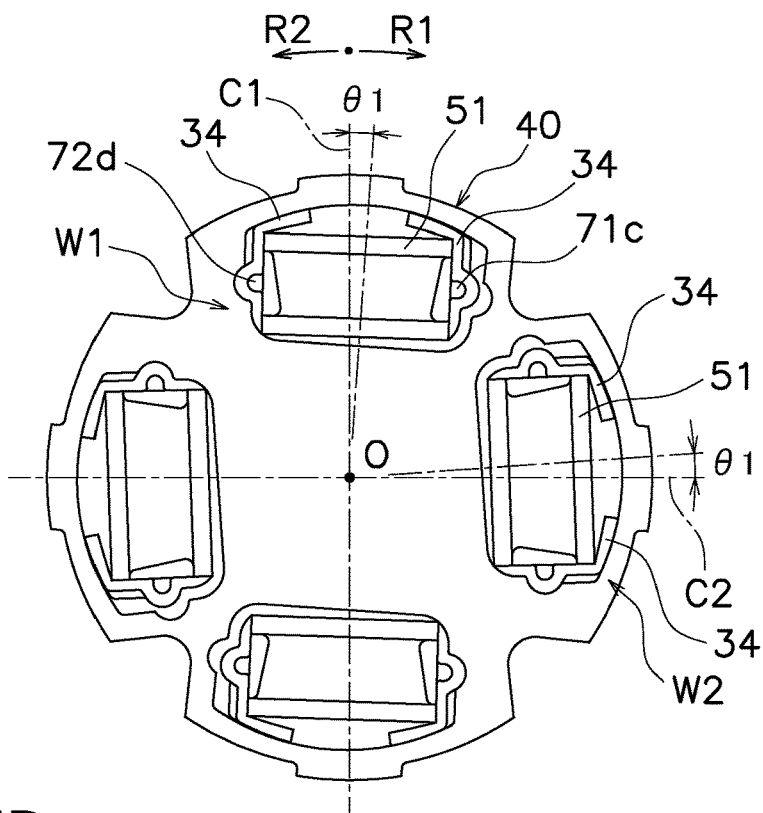
FIG. 5D is a schematic diagram for explaining the assembling method.

Next, as shown in FIG. 5D, the second fixture 72 is rotated to the R2 side by the angle θ1. Accordingly, the first plate 31 and the hub flange 40 take the posture corresponding to the neutral condition shown in FIG. 2.

[Actions]

It should be noted that the hysteresis torque is not considered in the following explanation of actions and torsional characteristics shown in FIG. 10A-10C.

<First Window Portions w1>

In the neutral condition without relative rotation between the input-side plate 30 and the hub flange 40, the axially opposed pair of first support portions 301 and the first accommodation portion 401 are disposed to be offset from each other in each first window portion w1; hence, the distance between the spring seats 34 opposed to each other in each window portion w1 is lesser in magnitude than the free length Sf of the coil spring 51. Therefore, in the neutral condition, a torsional torque–t is generated by the compressed coil springs 51 as shown in FIG. 10B.

When a torque inputted to the damper unit 20 fluctuates and torsion of the input-side plate 30 with respect to the hub flange 40 is caused to the R1 side (i.e., torsion of the hub flange 40 with respect to the input-side plate 30 is caused to the R2 side) by the offset angle θ1 from the neutral condition, the entirety of each axially opposed pair of first support portions 301 and the entirety of each first accommodation portion 401 overlap with each other as seen in the axial direction, whereby the distance between the spring seats 34 opposed to each other becomes L that is equal in magnitude to the free length Sf of the coil spring 51. Therefore, in this condition, the torsional torque becomes "0" as shown in FIG. 10B.

Then, when torsion of the input-side plate 30 with respect to the hub flange 40 is caused to the R1 side by a greater angle than the offset angle θ1, the distance between the spring seats 34 opposed to each other again becomes lesser in magnitude than the free length Sf of the coil spring 51. Therefore, when the angle of torsion of the input-side plate 30 with respect to the hub flange 40 becomes greater than the offset angle θ1, the coil spring 51 is compressed from the free-length-Sf state thereof, whereby the torsional torque gradually increases.

On the other hand, when torsion of the input-side plate 30 with respect to the hub flange 40 is caused from the neutral condition to the R2 side, the coil spring 51 is constantly compressed between the spring seats 34 opposed to each other. In other words, the torsional torque increases to the negative side with increase in torsion angle to the negative side in a negative-side torsional range as shown in FIG. 10B.

<Second Window Portions w2>

In the neutral condition, the axially opposed pair of second support portions 302 and the second accommodation portion 402 are disposed to be offset from each other in each second window portion w2 as likewise seen in each first window portion w1; hence, the distance between the spring seats 34 opposed to each other in each window portion w2 is lesser in magnitude than the free length Sf of the coil spring 51. Therefore, in the neutral condition, a torsional torque+t is generated by the compressed coil springs 51 as shown in FIG. 10C.

When torsion of the input-side plate 30 with respect to the hub flange 40 is caused from the neutral condition to the R1 side, the coil spring 51 is constantly compressed between the spring seats 34 opposed to each other. In other words, the torsional torque increases to the positive side with increase in torsion angle to the positive side in a positive-side torsional range as shown in FIG. 10C.

On the other hand, when torsion of the input-side plate 30 with respect to the hub flange 40 is caused from the neutral condition to the R2 side by the offset angle θ1, the distance between the spring seats 34 opposed to each other becomes L that is equal in magnitude to the free length Sf of the coil spring 51. Therefore, when the angle of torsion between the input-side plate 30 and the hub flange 40 is −θ1, the torsional torque becomes "0" as shown in FIG. 10C.

Then, when torsion of the input-side plate 30 with respect to the hub flange 40 is caused to the R2 side by a greater angle than the offset angle θ1, the distance between the spring seats 34 opposed to each other again becomes lesser in magnitude than the free length Sf of the coil spring 51. Therefore, when the torsion angle becomes greater than −θ1 to the negative side, the coil spring 51 is compressed from the free-length-Sf state thereof, whereby the torsional torque gradually increases to the negative side as shown in FIG. 10C.

<Net Torsional Characteristics>

Figure 10A:
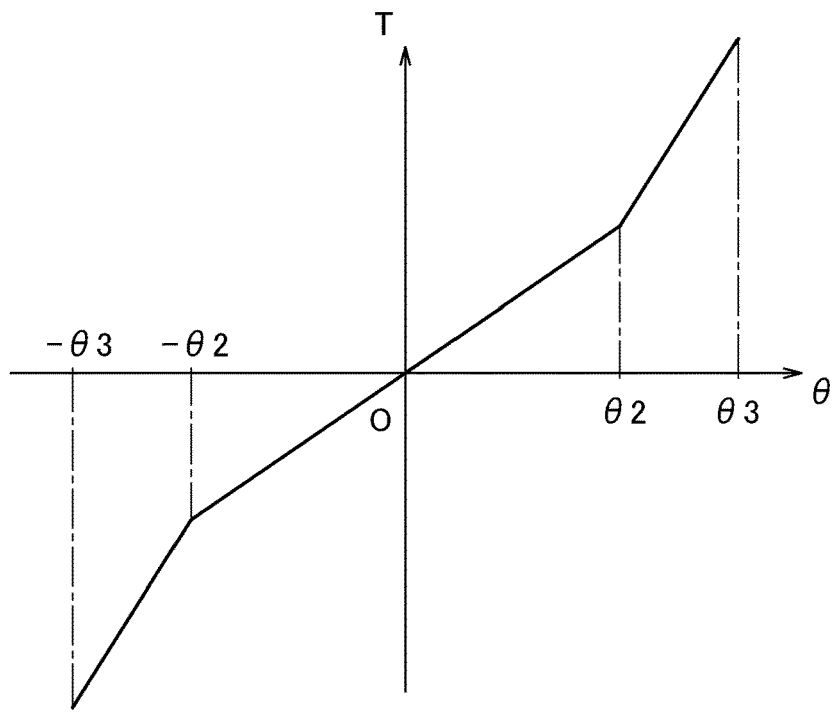
FIG. 10A is a chart showing torsional characteristics of a damper unit.
Figure 10B:
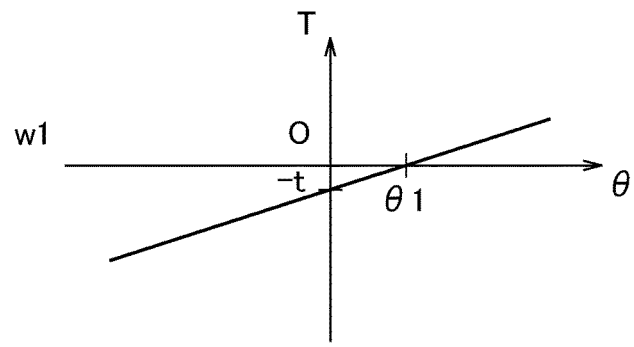
FIG. 10B is a chart showing torsional characteristics of the damper unit.
Figure 10C:
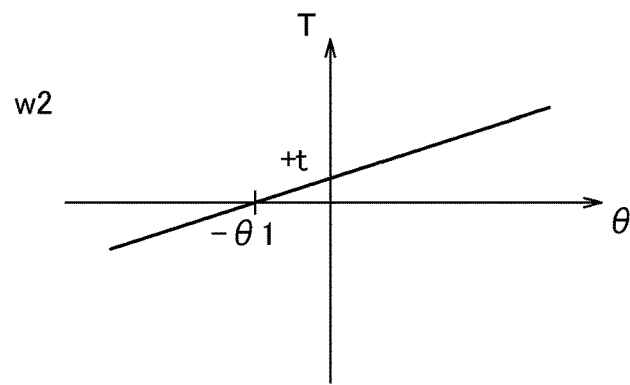
FIG. 10C is a chart showing torsional characteristics of the damper unit.

Torsional characteristics shown in FIG. 10A are net torsional characteristics obtained by adding the torsional characteristic shown in FIG. 10B and that shown in FIG. 10C and represent torsional characteristics of the entire damper unit. In other words, the torsional torque is "0" in the neutral condition and increases in magnitude to both positive and negative sides with increase in torsion angle to both positive and negative sides.

Besides, as shown in FIG. 10A, when the torsion angle reaches ±θ2, the resin member 52 in each window portion w1, w2 is compressed. Therefore, torsional characteristics of the entire damper device function as two-stage characteristics. Furthermore, when the torsion angle then reaches ±θ3, the stopper protrusions 42b of the flange 42 contact the stopper portions 31a of the first plate 31, whereby the input-side plate 30 and the hub flange 40 are prevented from rotating relative to each other.

Other Preferred Embodiments

The present invention is not limited to the preferred embodiment described above, and a variety of changes or modifications can be made without departing from the scope of the present invention.

(a) The shapes and/or so forth of the respective fixtures used in assemblage of the coil springs are not limited to those in the preferred embodiment described above. For example, the hub flange can be provided with at least one protrusion on the outer peripheral part thereof. Then, the at least one protrusion can be configured to be pressed by either or both of the fixtures such that the hub flange and the coil springs are compressed.

(b) The number of accommodation portions, that of support portions, and that of coil springs are exemplary only and are not limited to those in the preferred embodiment described above.

REFERENCE SIGNS LIST

1 Damper device
30 Input-side plate (first rotor)
301 First support portion
302 Second support portion
40 Hub flange (second rotor)
401 First accommodation portion
402 Second accommodation portion
51 Coil spring (first elastic member, second elastic member)
71 First fixture
71b Fixation pin (fixation portion)
71c Movement restricting pin
72 Second fixture
72d Pressing pin (pressing portion)

What is claimed is:

1. A method of assembling a damper device, the damper device including
a first rotor including a first support portion and a second support portion,
a second rotor rotatable relative to the first rotor, the second rotor including a first accommodation portion and a second accommodation portion, the first accommodation portion provided to be offset from the first support portion to a first side in a rotational direction, the second accommodation portion provided to be offset from the second support portion to a second side in the rotational direction,
a first elastic member disposed in a preliminarily compressed state in both the first support portion and the first accommodation portion,
a second elastic member disposed in a preliminarily compressed state in both the second support portion and the second accommodation portion, and
a pair of seat members supporting both end surfaces of the first elastic member, each of the pair of seat members including an assembling hole, the assembling holes of the pair of seat members allowing a first fixture for controlling actuation of the first elastic member to be attached thereto in a detachable manner when the first and second elastic members are assembled to the damper device,
wherein each of the assembling holes of the pair of seat members extends parallel to a rotational axis of the damper device such that the first fixture can be inserted from an axial side of the damper, the method comprising:
overlapping the first support portion of the first rotor and the first accommodation portion of the second rotor so as to eliminate an offset caused therebetween as seen in an axial direction; disposing the first elastic member in both the first support portion and the first accommodation portion overlapped with each other;

overlapping the second support portion of the first rotor and the second accommodation portion of the second rotor so as to eliminate an offset caused therebetween as seen in the axial direction by simultaneously compressing the first elastic member and rotating the second rotor relative to the first rotor to the first side in the rotational direction;

disposing the second elastic member in both the second support portion and the second accommodation portion overlapped with each other; and simultaneously compressing the second elastic member and rotating the second rotor relative to the first rotor to the second side in the rotational direction by an angle corresponding to the offset caused between the first support portion and the first accommodation portion.

2. The method of assembling a damper device according to claim 1, wherein in each of the overlapping the first support portion and the first accommodation portion, the disposing the first elastic member, the overlapping the second support portion and the second accommodation portion, the disposing the second elastic member, and the simultaneously compressing the second elastic member and rotating the second rotor, the first rotor is fixed to the first fixture in a non-rotatable manner.

3. The method of assembling a damper device according to claim 2, further comprising:

preparing a second fixture, the second fixture rotatable about a rotational center of the second rotor, the second fixture rotating the second rotor to the first side in the rotational direction in the overlapping the second support portion and the second accommodation portion, the second fixture rotating the second rotor to the second side in the rotational direction in the simultaneously compressing the second elastic member and rotating the second rotor.

4. The method of assembling a damper device according to claim 3, wherein the first fixture includes a fixation portion configured to make one of the end surfaces of the first elastic member non-rotatable, the one of the end surfaces disposed on the first side in the rotational direction, and the second fixture includes a pressing portion configured to compress the first elastic member in contact with another of the end surfaces of the first elastic member, the other of the end surfaces disposed on the second side in the rotational direction.

5. The method of assembling a damper device according to claim 4, wherein the pair of seat members includes a first seat member and a second seat member, the first seat member supporting the one of the end surfaces of the first elastic member on the first side in the rotational direction, the second seat member supporting the other of the end surfaces of the first elastic member on the second side in the rotational direction, the fixation portion of the first fixture is attachable to the first seat member in a detachable manner, the pressing portion of the second fixture being attachable to the second seat member in a detachable manner, in the overlapping the second support portion and the second accommodation portion, and the simultaneously compressing the second elastic member and rotating the second rotor, the fixation portion attached to the first seat member is caused to contact the one of the end surfaces of the first elastic member on the first side in the rotational direction so as to restrict movement of the one of the end surfaces of the first elastic member, and in the overlapping the second support portion and the second accommodation portion, and the simultaneously compressing the second elastic member and rotating the second rotor, the pressing portion attached to the second seat member is caused to contact the other of the end surfaces of the first elastic member on the second side in the rotational direction so as to actuate the first elastic member.

6. The method of assembling a damper device according to claim 5, wherein a distance between the first and second seat members is equal in magnitude to a free length of the first elastic member.

7. The method of assembling a damper device according to claim 1, wherein the angle corresponding to the offset caused between the first support portion and the first accommodation portion is equal to an angle corresponding to the offset caused between the second support portion and the second accommodation portion.

8. A damper device comprising:

a first rotor including a first support portion and a second support portion;

a second rotor rotatable relative to the first rotor, the second rotor including a first accommodation portion and a second accommodation portion, the first accommodation portion provided to be offset from the first support portion to a first side in a rotational direction, the second accommodation portion provided to be offset from the second support portion to a second side in the rotational direction;

a first elastic member disposed in a preliminarily compressed state in both the first support portion and the first accommodation portion, the first elastic member elastically coupling the first rotor and the second rotor in the rotational direction;

a second elastic member disposed in a preliminarily compressed state in both the second support portion and the second accommodation portion, the second elastic member elastically coupling the first rotor and the second rotor in the rotational direction; and a pair of seat members supporting both end surfaces of the first elastic member, each of the pair of seat members including an assembling hole, the assembling holes of the pair of seat members allowing a fixture for controlling actuation of the first elastic member to be attached thereto in a detachable manner when the first and second elastic members are assembled to the damper device;

wherein each of the assembling holes of the pair of seat members extends parallel to a rotational axis of the damper device such that the fixture can be inserted from an axial side of the damper.

9. The damper device according to claim 8, wherein the assembling holes of the pair of seat members are shaped to allow the fixture attached to the damper device to press the first elastic member in contact with both the end surfaces of the first elastic member.

* * * * *